United States Patent [19]

Cates

[11] Patent Number: 4,589,814
[45] Date of Patent: May 20, 1986

[54] BOAT AND CAR TRAILER

[76] Inventor: Medwin A. Cates, 1122 N. 14th St., Collinsville, Okla. 74021

[21] Appl. No.: 637,292

[22] Filed: Aug. 3, 1984

[51] Int. Cl.$^4$ .............................. B60P 3/08; B60P 3/10
[52] U.S. Cl. ................................ 414/484; 280/414.1; 410/24; 414/494; 414/495
[58] Field of Search ...................... 280/414.1; 414/469, 414/471, 483, 484, 494, 495; 410/13, 24, 14, 26, 6

[56] References Cited

U.S. PATENT DOCUMENTS

| | | | |
|---|---|---|---|
| 3,677,425 | 7/1972 | Patten | 410/26 X |
| 3,870,339 | 3/1975 | Goff | 280/414.1 |
| 3,970,203 | 7/1976 | Watson | 280/414.1 X |
| 4,068,772 | 1/1978 | Prudhomme | 414/477 |
| 4,188,056 | 2/1980 | Watson | 280/414.1 X |
| 4,221,420 | 9/1980 | Vencill et al. | 280/414.1 X |
| 4,406,477 | 9/1983 | McDonald | 280/414.1 |
| 4,420,165 | 12/1983 | Goodin | 280/414.1 |
| 4,469,346 | 9/1984 | Low | 280/414.1 |

FOREIGN PATENT DOCUMENTS

| | | | |
|---|---|---|---|
| 1188175 | 9/1959 | France | 410/26 |
| 1297191 | 4/1962 | France | 410/26 |

Primary Examiner—John A. Pekar
Attorney, Agent, or Firm—Head, Johnson & Stevenson

[57] ABSTRACT

This application covers a trailer which has platforms at two levels, one for a boat and one for an automobile. It includes a frame supported by wheels, a primary loading platform which rests on the main frame and is pivotally attached thereto so that it can be tilted therewith. An upper or secondary load carrying platform is supported above the primary load platform by four stanchion. Means are provided to pull the secondary load platform down to the first load platform and then pivot the two so that a boat can be pulled onto the upper or secondary load platform. Then, the upper load platform is pivoted about the stanchion to an upright position and locked in place. The secondary or primary loading platforms are then pivoted together and the lower platform can then be loaded, for example, by driving a car up on it. When it is loaded, then the fixed primary and secondary loading platforms are rotated about the pivot so that they rest securely on the main frame. Means are provided to secure the platforms to the frame.

8 Claims, 15 Drawing Figures

BOAT AND CAR TRAILER

BACKGROUND OF THE INVENTION

Field of the Invention

This present invention relates to trailers in general and in particular to trailers for receiving two separate loads one above the other.

Recreational vehicles in which people can drive to remote spots in the country and in which they man sleep, cook food and so forth, are becoming very popular. Many times it is desired that they have a boat available and also a smaller car for running errands or general sight seeing after the recreational vehicle has been parked at a selected location. Some people merely lift the boat on top of the recreational vehicle and tow a smaller car. However, this is not always feasible or practical, especially when one considers the weight of a boat and the problem of lifting it to the top of the recreational vehicle. Sometimes trailers have been provided for the boats and also sometimes for the cars. However, I know of no trailer available which can carry a boat at one level and a car at another level and which both can be loaded by one man without undue exertion. It is an object of this invention to provide such a trailer.

SUMMARY OF THE INVENTION

This invention relates to a multi-level trailer for carrying a boat at one level and a car at a second level. It includes a main frame supported by wheels. A primary loading platform rests on said main frame and is pivotally supported on a horizontal axis near the end of the main frame so that the primary loading platform can be rotated from an at rest position on the frame to a tilted position where its rear end can rest on the ground.

A secondary loading platform is supported from said primary platform by a pair of upright support members called front stanchions and a pair of rear stanchions. Each stanchion is pivotally connected at a lower end to the primary loading platform and at its upper end to the secondary or upper loading platform. Thus, looking at it from the sides, a front and a rear stanchion and the side of the primary and secondary loading platforms define a parallelogram. The parallelogram structure can be collapsed so that the secondary loading platform rests on the primary loading platform. It is at this point that the two loading platforms are tilted so that a boat can be pulled by a winch upon the tilted secondary or upper loading platform. At this point, the parallelogram structure is pulled upwardly so that the stanchions are in a upright position and are then locked so that the parallelogram becomes a fixed rectangle. If it is desired to load a vehicle into the lower or primary loading platform, the upper or forward end of the primary loading platform is lifted so that both the fixed parallelogram or rectangular structure tilts about an axis near the rear end of the main frame until the primary loading platform which extends beyond the main frame rests on the ground. At this point, an automobile can be driven onto the primary loading platform and the rectangular structure is then lowered so that the primary loading platform rests snuggly on the main frame. Means are provided to secure the primary loading platform to the main frame.

DETAILED DESCRIPTION OF THE PREFERRED EMBODIMENT

Figure 1:
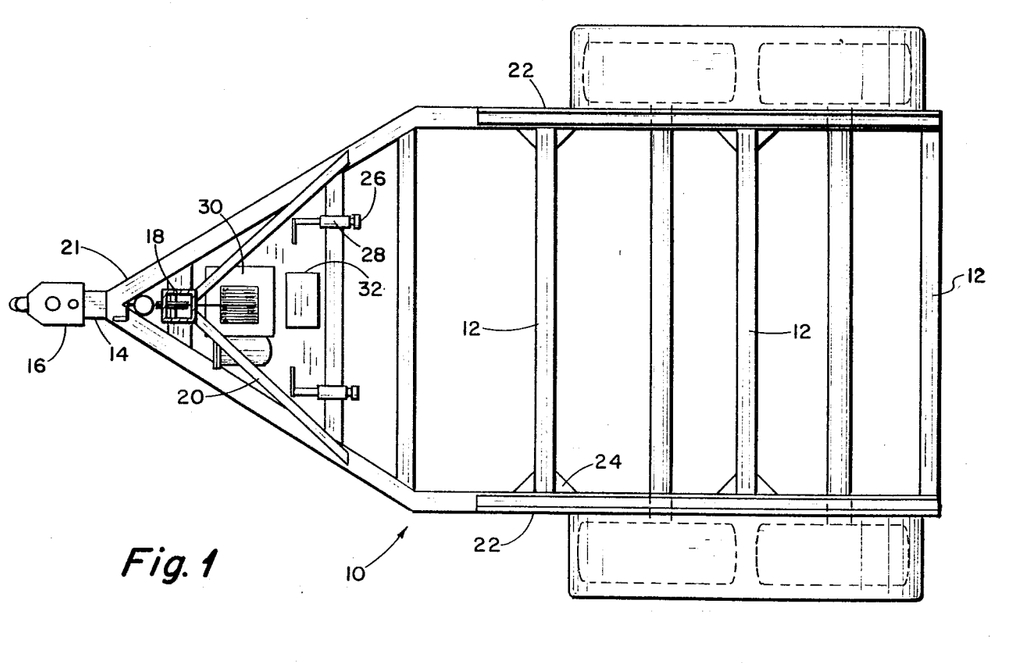
FIG. 1 is a top view of the main frame taken along the line 1—1 of FIG. 5.
Figure 5:
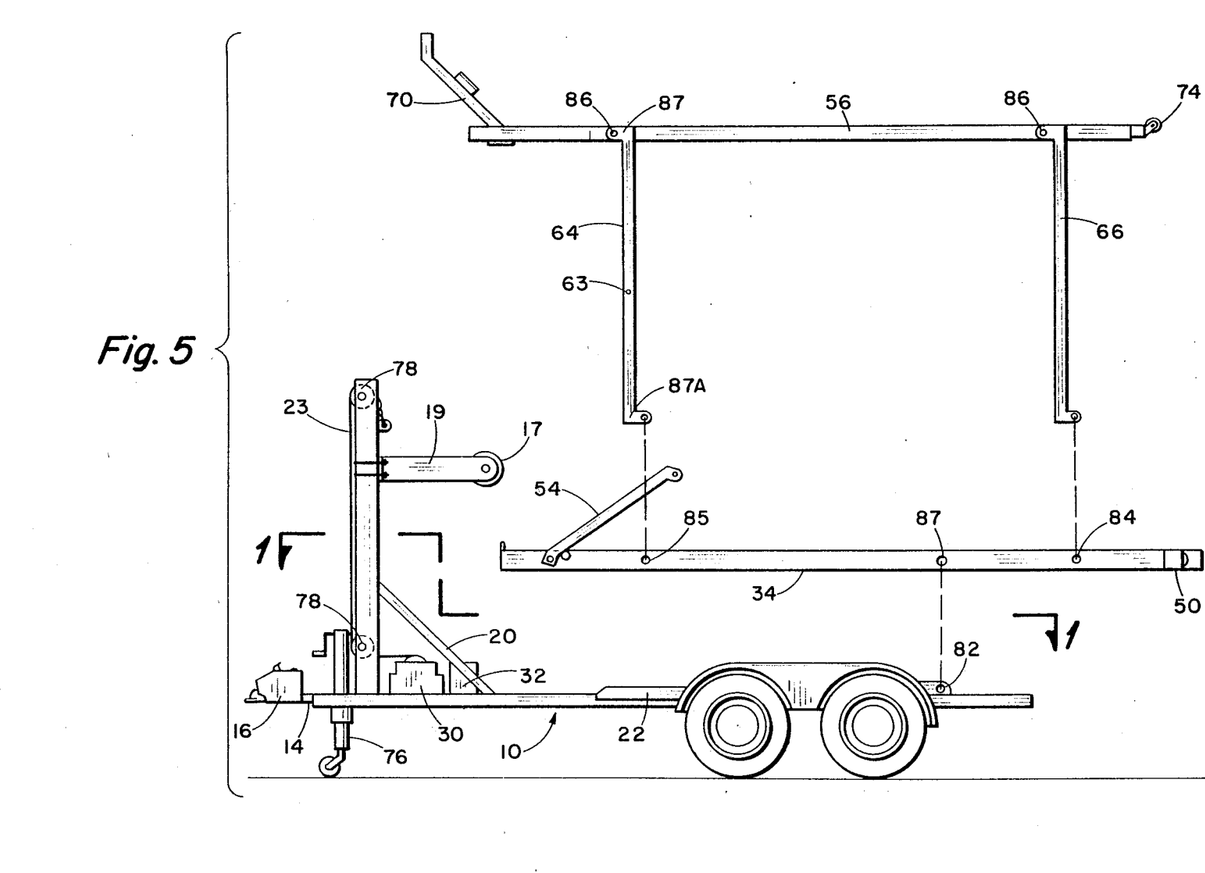
FIG. 5 illustrates the trailer in exploded view showing the main frame, the primary loading platform and the secondary loading platform.

Attention is first directed to FIG. 5 which shows an exploded side view of the trailer in my invention. Shown thereon is main support frame or section 10, primary loading platform 34 and upper or secondary loading platform 56. Attention will now be directed to FIGS. 1 and 5 to show the structure of the main frame support. This includes a side guide 22 on either side thereof for guiding the primary platform 34. A plurality of cross-frame braces 12 is provided to give it rigidity. Gussets 24 are provided to give rigidity to the selected cross-members or frame braces 12. A tongue 14 and hitch with the brake accessory 16 is provided at the front end thereof. A mast 18 with braces 20 is provided on frame 10 and may be an electrical winch using 12 volts which may be a common automobile battery. Vertical mast 18 supports horizontal mast arm 19 which is provided for sheave 17 over which cable or winch line 23 extends. Mast 18 also supports sheave 78 over which line 23 extends. The height of mast arm 19 can be adjusted if desired by attaching it to vertical mast 18 by u-bolts or other adjustable means.

Also provided on one of the forward cross-braces or frame braces 12 is cam latch 26 and cam latch guide 28. As will be seen, these are used for securely latching the primary loading platform 34 down to the frame 10.

Figure 2:
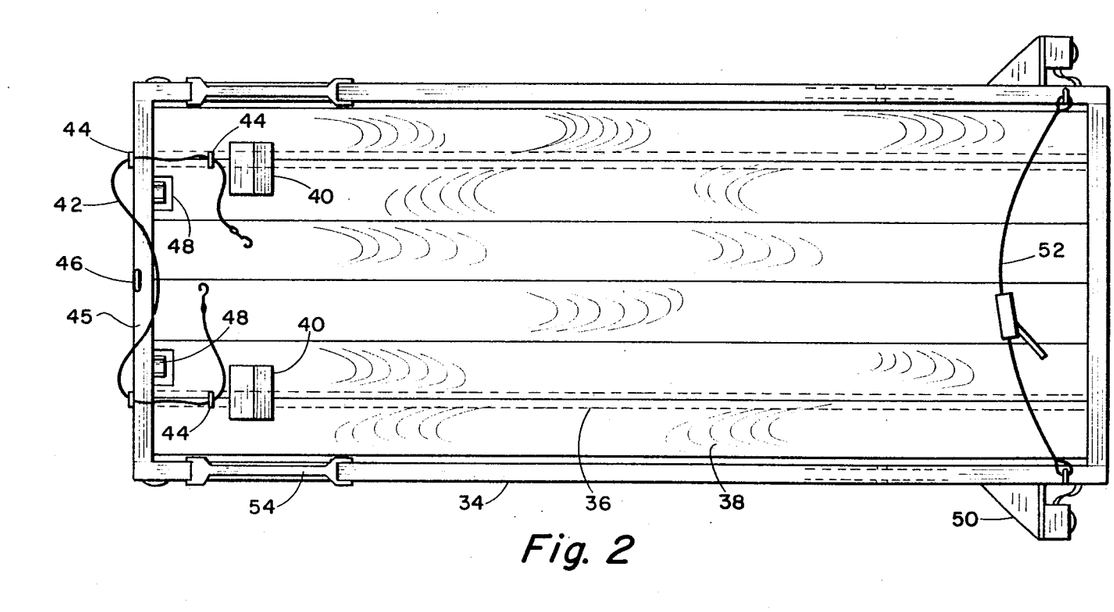
FIG. 2 is a top view of the lower or primary loading platform.

In conjunction with FIG. 5, attention is now especially drawn to FIG. 2 which illustrates a top view of the primary loading platform 34. Shown thereon, is main frame 34 for the primary loading platform and load support braces 36 which are indicated by the dotted lines and floor 38 which may be wood such as redwood. Vehicle stopping blocks 40 are provided at the left or forward end of the primary loading platform. These blocks are preferably made of wood and are sloping downwardly at the back as shown in FIG. 5. Also shown in FIG. 2 is a secondary loading platform brace 54 having hold 55, and which is pivotally attached to main platform 34. A bracket 50 to support lights is also provided at the rear or aft end of the frame 34.

Figure 10:
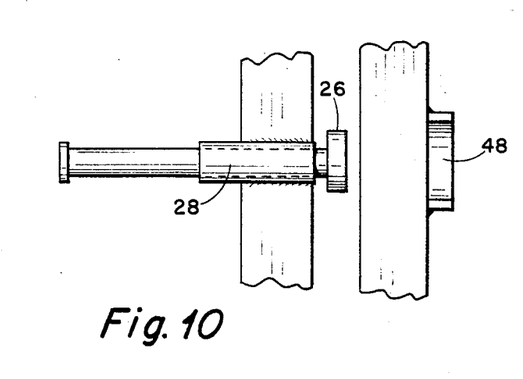
FIG. 10 illustrates a cam lock for holding the primary loading platform to the main frame.
Figure 11:
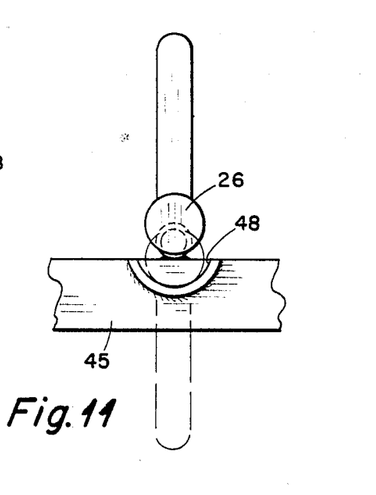
FIG. 11 is an end view of that FIG. 10.

At the left or forward end of the platform in FIG. 2, there is shown eye 46 which will be seen, is used for tilting the primary loading platform 34. Also shown is cinch line 42 which extends through eyes 44 and which has hooks at each end there to connect to the vehicle loaded on the frame. Also shown at the forward end of the platform 34 in FIG. 2, are came latch saddles 48 as will be more fully seen in regard to FIGS. 10 and 11.

Also shown in FIGS. 5 and 2 are hinge points 84 and 85 on a main frame member of main loading platform 34 and tilt pivot 87 which mates with the main platform tilte point 82. A rear cinch line with ratchet 52 is provided at the rear or aft end of the platform shown at FIG. 2. This is used for cinching the rear end of a motor vehicle to prevent its bouncing and swaying.

Figures 3, 4:
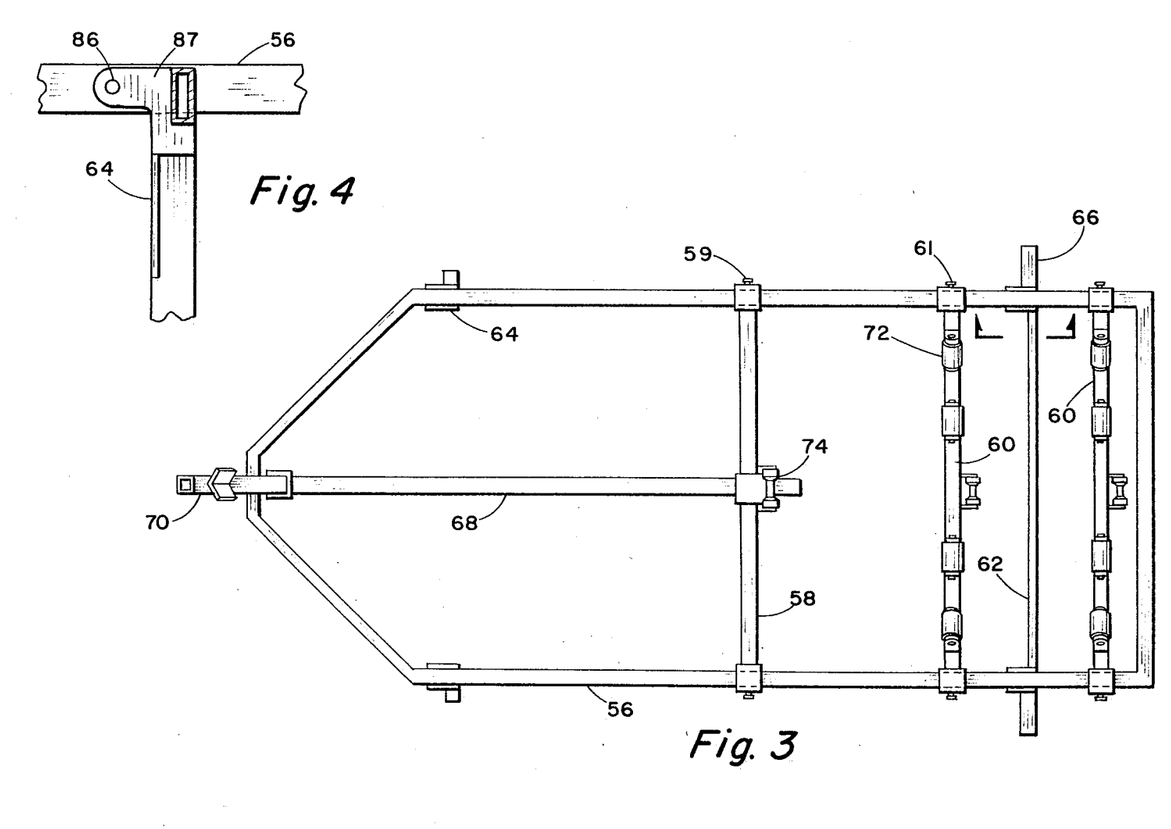
FIG. 3 is a top view showing the upper or secondary loading platform.
FIG. 4 illustrates the pivotal connection of the upper stanchions to the secondary frame of FIG. 3.

Attention is next directed to FIG. 3 which shows a top view of the secondary loading platform 56. This will be discussed in relation to the exploded view of FIG. 5. Shown thereon is the main frame 56 for the secondary loading platform and adjustable loading members 58 which can be slid along frame 56 and tightened in place by set screws 59. Also shown, are adjustable loading members 60 which may be held in position by set screws 61. Members 60 also supports roller 72 thereon. A brace 62 is also provided across the frame for increased stability. Also shown, is a front supporting stansion 64 for the secondary loading platform and rear supporting stanchions 66 for the secondary loading platform. A bracing guide 68 is provided between members 58 and the forward end of the frame 56. Loading member 58 is adjustable along guide 68. Also shown is an adjustable nose rest 70 for receiving the forward end of a boat. Center adjustable rollers 74 are also provided on brace 68. FIG. 4 illustrates how the stanchions 64 and 66 are attached to the frame 56. This includes a right angle member 87 having a hinge point 86 on the secondary platform. This is similar but reversed from the connection of the stanchions to the lower hinge points 84 and 85 in which the right angle leg is to the rear. This is to permit the parallelogram to collapse toward the rear but not toward the front. Lower stanchion arm 87A may be made to rest on frame 22 and thus, stansion 64 can only rotate to the rear. Brach 54 is also attached between the frame 34 and hole 63 in stansion 64 to give it additional rigidity.

Figure 6:
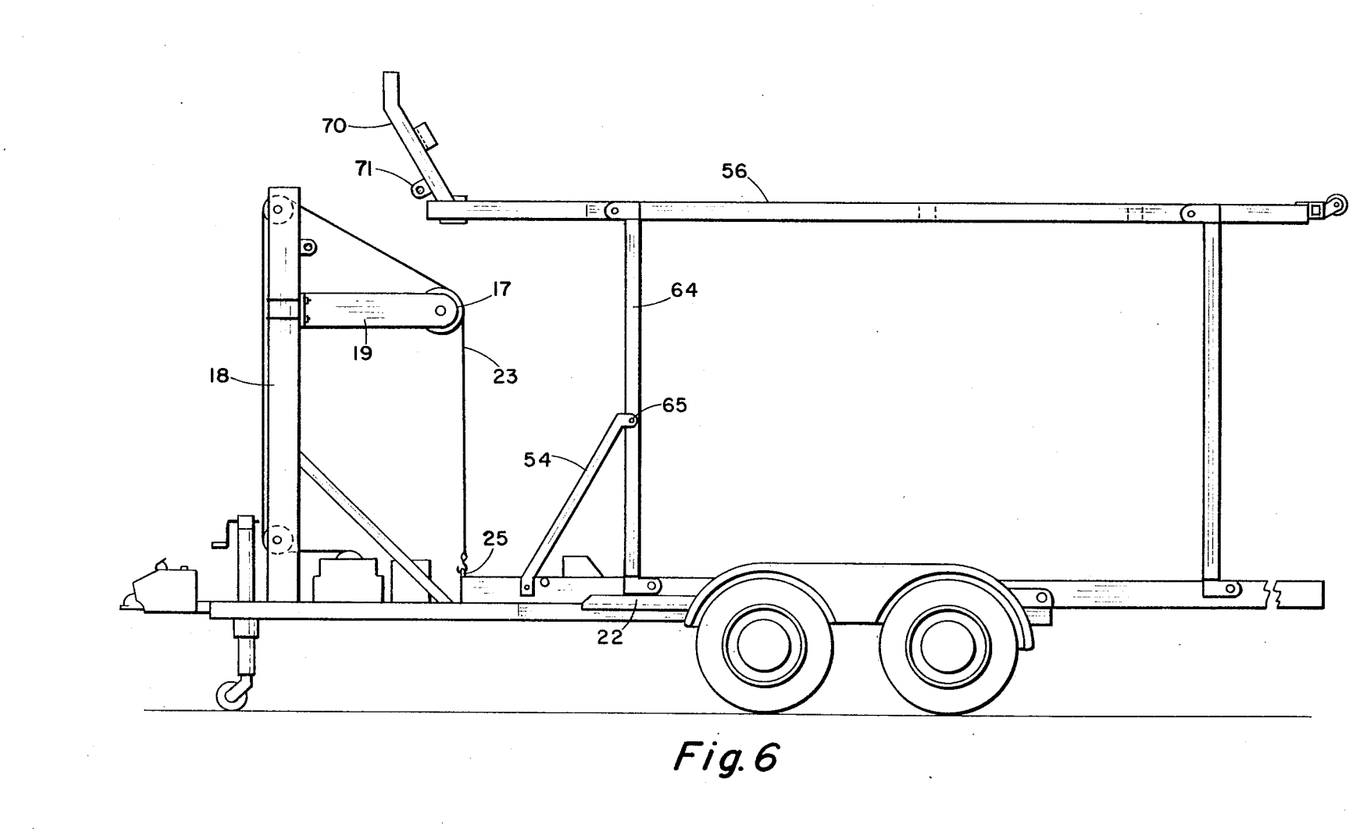
FIG. 6 illustrates a side view of the trailer showing the parts of FIG. 5 in their normal position.

FIG. 6 is similar to FIG. 5 except that instead of showing the parts in exploded view, they are in their normal position with brace 54 in place with pin 65 through holes 55 and 63 rigidly holding the upper or secondary platform 56 in a fixed position in relation to the primary loading platform 34. Winch line 23 is connected through an eye 25 in the forward end of the primary platform 34. Attention will next be directed twoard an explanation of the operation of the trailer so that a boat can be put on the upper platform 56 and an automobile can be put on the lower platform 34.

Figure 7:
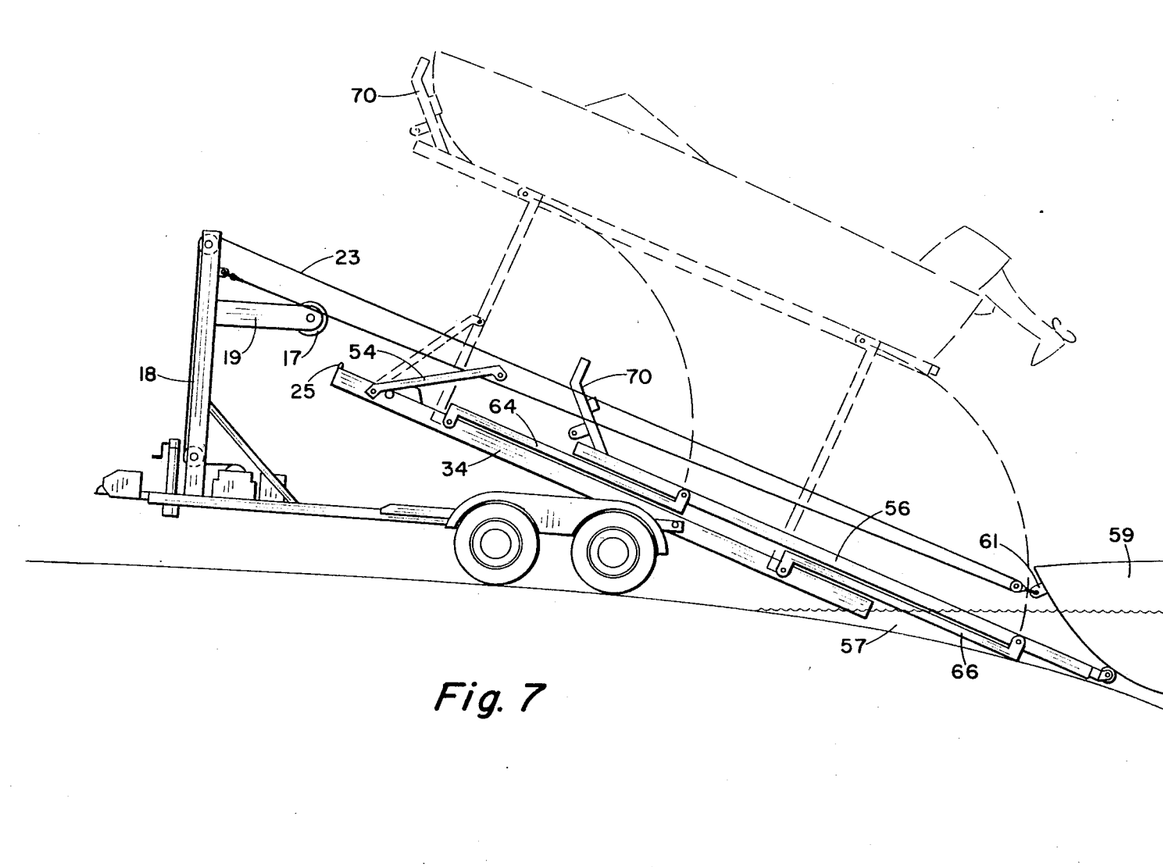
FIG. 7 illustrates the collapsed position of the upper or secondary loading platform for loading a boat.
Figure 12:
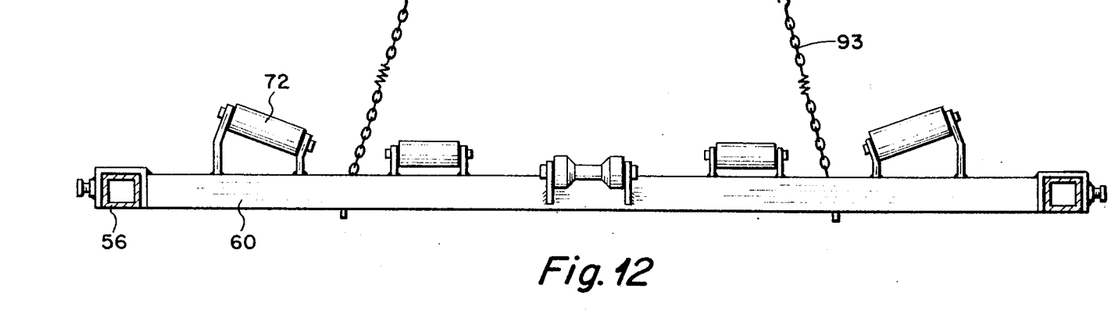
FIG. 12 illustrates the rear end view of the upper or secondary loading platform.

Starting with the trailer in the position shown in FIG. 6, it is to be understood that it is always necessary to load the boat first and to unload it last. When it is desired to load the boat, the brace 54 is disconnected from stanchion 64 on each side by removing pin 65 from hole 63. This permits the platform 56 to collapse backwardly toward the rear onto primary loading platform 34 into the position shown in the solid lines in FIG. 7. This collapsement can occur easily by merely pushing gently on stanchion 64. It is noted that the rear end of upper loading platform 56 is submerged in water 57 upon which the boat 59 to be loaded is resting. Line 23 connects to an eyelet 61 at the forward end of the boat 59. The boat is then pulled by a winch line 23 until its forward end rests on rest 70 to which it them may be secured. The boat 59 and upper or secondary loading platform 56 is now ready to be raised to the upper position indicated by the dotted lines. This is accomplished by connecting the line 23 to eyelet 71 of adjustable nose brace 70. Continued pulling on line 23 will raise the boat 59 and upper platform 56 to the position shown in dotted lines in FIG. 7. At this time, brace 54 is attached to stansion 64. This would be done on each side of the trailer. When the boat is raised to its upright position, its weight will normally, upon relaxing line 23, cause the platform 34 to rest on the main platform 10. The rear end of the boat can be secured by chains 93 as shown in FIG. 12. It may also be attached to nose rest 70 in any known manner.

Figure 8:
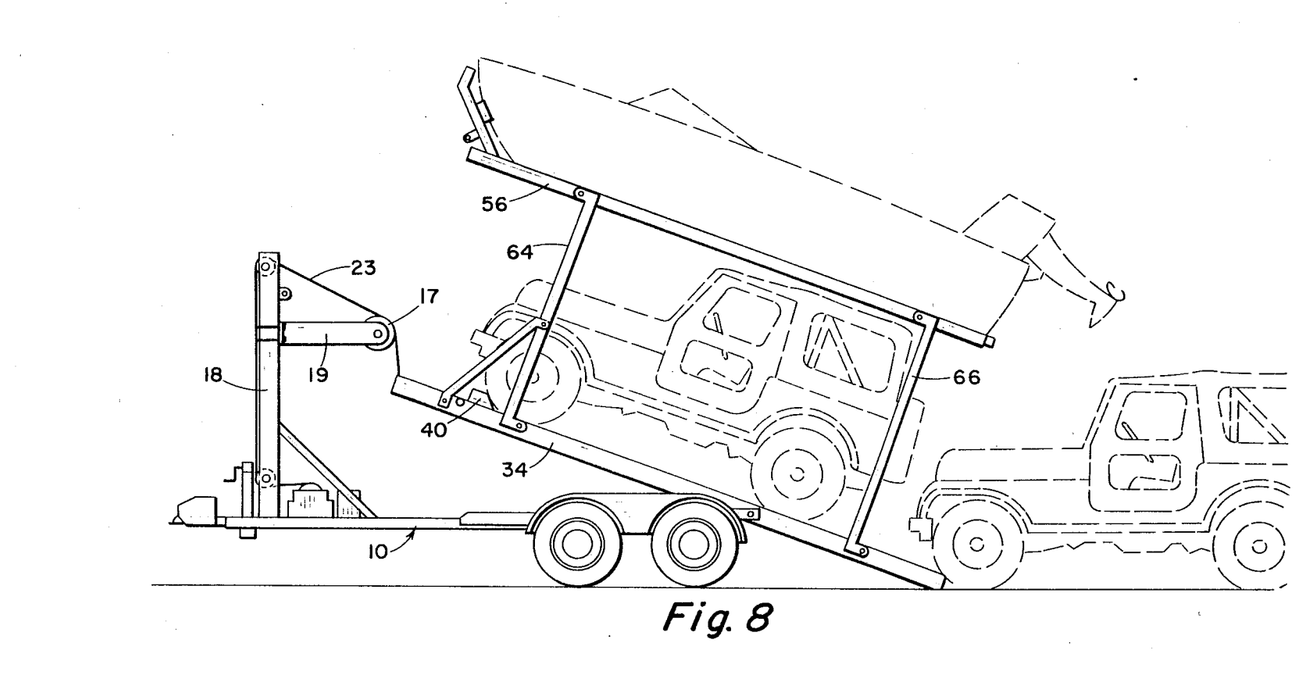
FIG. 8 illustrates the position of the primary and secondary loading platforms when loading a car onto the primary loading platform.
Figure 9:
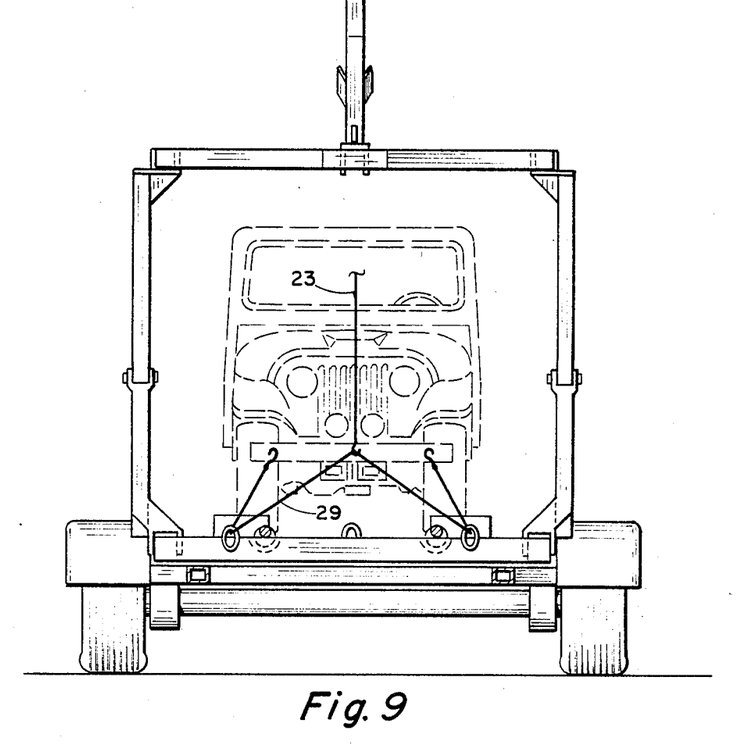
FIG. 9 illustrates the front end view of the trailer showing a vehicle in hold down position.
Figure 13:
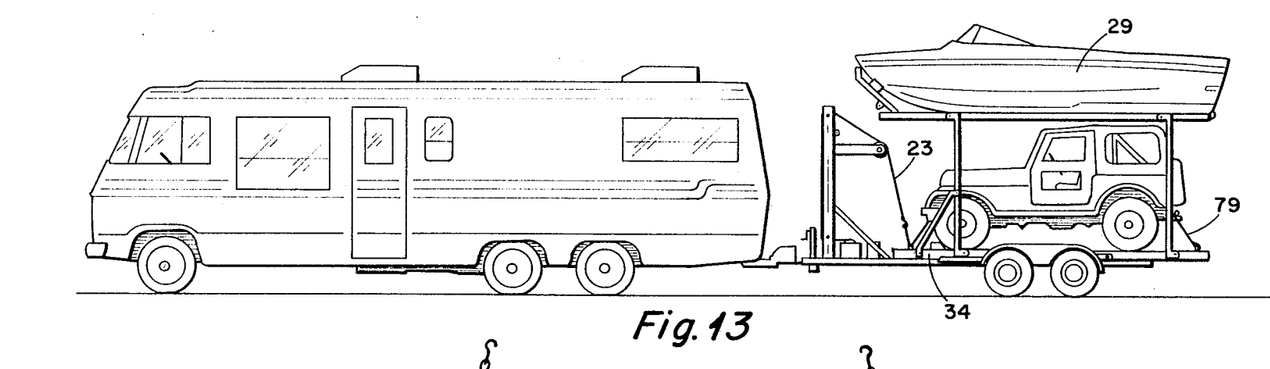
FIG. 13 illustrates a side view of the boat and motor vehicle loaded on a trailer behind a recreational vehicle.

Once the boat has been loaded, it will normally be desired to load a vehicle such as a jeep onto the main loading platform 34. In order to do this, the platform 34 must be tilted so that the rear end touches the ground so that the jeep can be driven in. This can be done by connecting line 23 to the eyelet 25 and lifting the platform 34. While the platform is in the tilted position shown in FIG. 8, the jeep can be driven in as indicated by the dashed line thereon. Once the jeep is in position shown where the wheels are against blocks 40, then the winch can be released and the platform 34 will be lowered down to frame 10, all as shown in FIG. 13. It is important to secure the primary platform 34 to the frame 10. This can be accomplished by use of the cam and cam handle shown in FIG. 10, cam latch 26 into cam saddle 48. It is also important to tie the front of the loaded vehicle down, this can be accomplished by using a flexible line 29 which has hooks at each end for connecting into attachments to the frame thereof. Then, winch line 23 is connected to the center point thereof and is tightened the desired amount. This is as shown in FIG. 9.

The position of the various components, the boat, the motor vehicle and the recreational vehicle is all shown in FIG. 13. The total entourage is now ready for travel. When one gets to the point where it is desired to unload the motor vehicle and the boat, all that is necessary to do is essentially the reverse of the steps of loading the vehicle and boat. It will be noted that the automobile must be removed first. This is easily accomplished by releasing cams 26 so that the lower frame 34 can be raised. The front tiedown 29 and the rear tiedown 79 are released and line 23 is connected to eye 46 of the lower or primary loading platform 34 and it is raised. When the rear end of this platform touches the ground, the vehicle is driven off. It if is desired to lower the boat 29 to the water, the line 23 is connected to eye 71 on brace 70. Pins 65 are then removed and if the platform is on a sloping position back toward the rear, the platform 56 will move backward to collapse the structure as the line 23 is released. This continues until it is collapsed. Then line 23 is connected to eyelet 46 on the main loading platform 34 and then line 23 is pulled in. The shifting of the boat backwardly will cause the collapsing and this will cause the frame 34 to pivot about point 82 so that the boat can be slid on the rollers into the water by releasing line 23.

It is important to comment that our operation can be conducted by one person without exerting great strength. The control of the winch is on a switch at the end of a long line so that certain operations of the winch can be conducted even from the interior of the vehicle being driven on or off the trailer. This is especially important for use of the trailer by people who, for various health reasons, should not exert themselves and by anyone who needs to operate the system by oneself.

Figure 14:
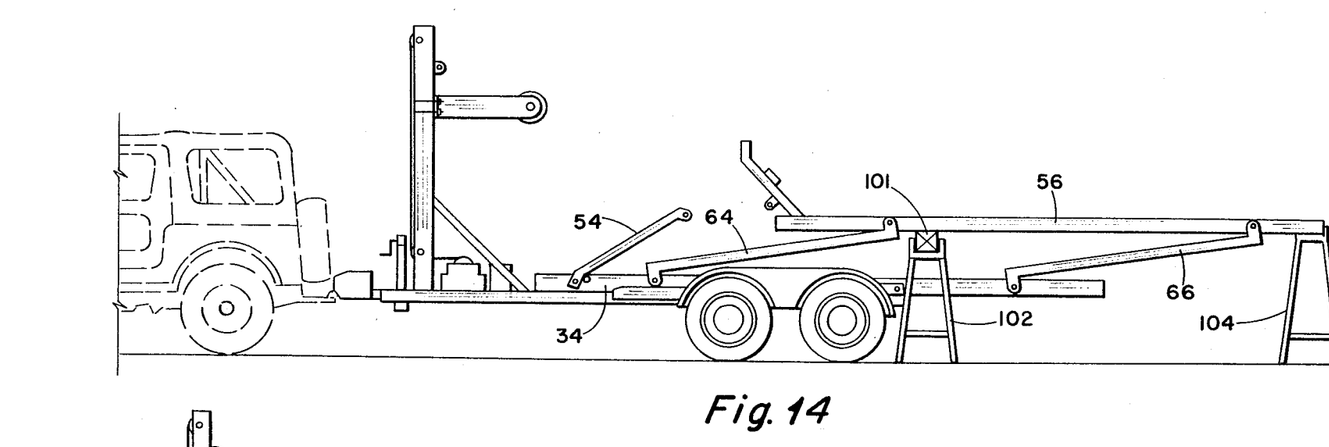
FIG. 14 illustrates the removability of the secondary loading platform leaving merely a flat bed trailer.
Figure 15:
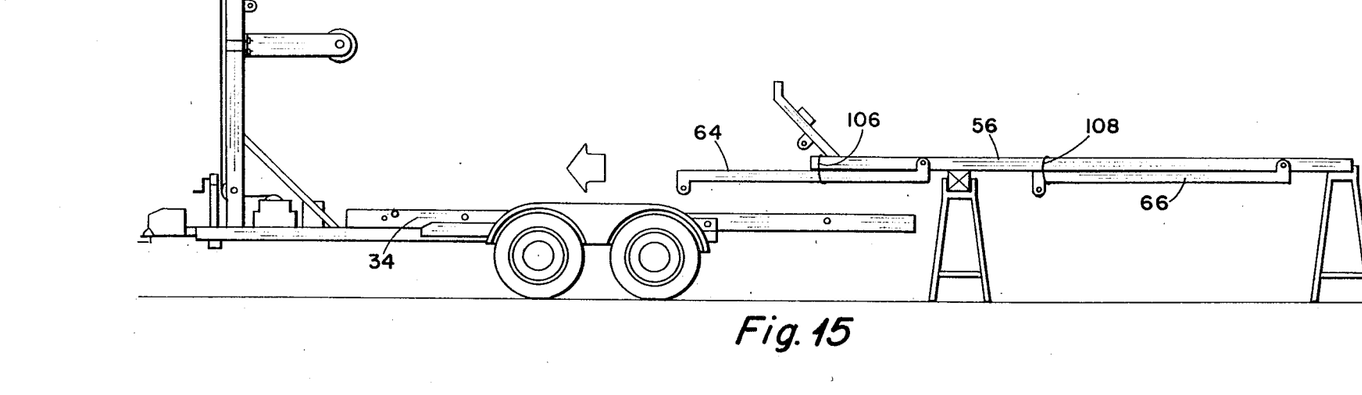
FIG. 15 illustrates the secondary loading platform and stanchions removed from the primary loading platform.

Sometimes it may be desired to remove the upper or secondary loading platform 56 and have only the lower platform 34 on the trailer. This might be useful if one wishes to haul high stacks of hay or other objects extending upwardly from the platform 34 to a level sufficiently hight where secondary platform 56 might interfer therewith. This can be easily accomplished as shown in FIG. 14 and FIG. 15. The parallelogram frame is collapsed until secondary platform 56 rests on cross-members 101 supported on stand 102 as shown in FIG. 14. There is a stand 102 on each side of the trailer and the cross-member 101 extends therebetween. Also, at the extreme aft end is a third stand 104 upon which the rear end of platform 56 will rest. At this time, upright stanchions 64 and 66 are disconnected from main platform 34 by removing the pivot bolts. Then, the stansions 64 and 66 are secured to platform 56 by lines 106 and 108 respectively. Also, brace 54 can be removed from platform 34. At this time, platform 56 is completely removed from platform 34 and the trailer can be pulled out as indicated in FIG. 15. This illustrates additional versatility of my invention.

While the invention has been described with a certain degree of particularity, it is manifest that many changes may be made in the details of construction without departing from the spirit and scope of this disclosure. It is understood that the invention is not limited to the embodiment set forth herein for purposes of exemplification but is limited only by the scope of such claim or claims including the full range of equivalancy to which each element thereof is entitled.

What is claimed is:

1. A trailer for supporting a primary load and a secondary load comprising:
a main frame supported by wheels;
a primary loading platform supported from said frame and having a pivot means near the rear end of said main frame so that said primary loading can be rotated from an at rest horizontal position on said frame to a tilted position rearwardly with respect to the trailer;
a secondary loading platform;
a pair of front stanchions and a pair of rear support stanchions each stanchion pivotally connected at its lower end to said primary loading platform and at its upper end to said secondary loading platform;
means to fix said stanchions to prevent rotation.

2. A trailer as defined in claim 1 including means to apply force to said primary loading platform to cause it to rotate from its tilted position to said at rest position.

3. A trailer as defined in claim 2 in which said means to fix includes a cam latch saddle on the rear side of the forward cross-member of said primary loading platform and cam latch and cam guide supported from a forward cross-member of said main frame which is located to the front of said primary loading platform cross-member.

4. A trailer having a front end and a rear end and which comprises:
a main frame supported by wheels, said main frame having a pivot point to the rear of said wheels, a mast rigidly supported from said main frame at the front end of said trailer and supporting a sheave means above a said main frame;
a winch having a line and supported from said main frame, said line extendable over said sheave;
a primary loading platform having a frame comprising two elongated side members with cross-members therebetween each said side rail having a forward horizontal pivot hole, a rear horizontal pivot hole and tilt hole to front of said rear horizontal pivot hole;
pivot means connecting said tilt hole of said primary loading platform and the pivot piont of said main frame;
a secondary loading platform having a frame to be positioned above said primary loading platform, said secondary loading platform having a side rail on either side thereof and cross-members therebetween and each said side rail having a forward horizontal pivot hole and a horizontal rear pivot hole;
two front stanchions for supporting the secondary loading platform from said primary loading platform, each said stanchion having a forward directed right angle arm at the upper end with a hole in said arm and a rear directed right angle arm at the lower end thereof having a horizontal hole therein;
bolt means insertable through said upper horizontal hole of said stanchion and extending the corresponding holes in said frame of the secondary loading platform and bolts extendable through the lower horizontal holes of each said stanchion and through the corresponding horizontal pivot holes in said primary loading plaform so that said secondary loading platform and said primary loading platform in said stanchion form a parallelogram type structure that is tiltable toward the rear of said trailer;
means to fix said front stanchion with respect to said primary loading platform;
an eyelet means on the front end of each of said primary loading platform and said secondary loading platform for selective attachment to said winch line;
means to secure the front end of said primary loading platform to said main frame.

5. A trailer as defined in claim 4 in which said mast is a vertical member supported from said main frame and has a horizontal mast arm supported above the main frame for supporting said line and said sheave.

6. A trailer as defined in claim 4 in which said means to secure includes a cam latch saddle on the rear side of the forward cross-member of said primary loading platform and a cam latch and a cam guide supported from a forward cross-member of said main frame which is located to the front of said primary loading platform cross-member.

7. A trailer as defined in claim 4 in which said means to secure includes a cam latch saddle on the rear side of the forward cross-member of said primary loading platform and a cam latch and cam guide supported from a forward cross-member of said main frame which is located to the front of said primary loading platform cross-member.

8. A trailer as defined in claim 7 including means to apply force to said primary loading platform to cause it to rotate from a tilted position to said at rest position.

* * * * *